US008769658B2

(12) United States Patent
Celante et al.

(10) Patent No.: US 8,769,658 B2
(45) Date of Patent: Jul. 1, 2014

(54) SYSTEM FOR THE DISPLAY, BY A USER, OF MULTIMEDIA CONTENT ITEMS

(71) Applicant: Rotas Italia SRL, Treviso (IT)

(72) Inventors: Francesco Celante, Treviso (IT); Enrico Mason, Mogliano Veneto (IT)

(73) Assignee: Rotas Italia SRL, Treviso (IT)

( * ) Notice: Subject to any disclaimer, the term of this patent is extended or adjusted under 35 U.S.C. 154(b) by 0 days.

(21) Appl. No.: 13/660,419

(22) Filed: Oct. 25, 2012

(65) Prior Publication Data

US 2013/0111574 A1 May 2, 2013

(30) Foreign Application Priority Data

Oct. 28, 2011 (IT) .............................. PD2011A0339

(51) Int. Cl.
*G06F 7/04* (2006.01)
*H04W 12/06* (2009.01)
*H04W 12/08* (2009.01)

(52) U.S. Cl.
CPC .............. *H04W 12/06* (2013.01); *H04W 12/08* (2013.01); *H04L 2209/805* (2013.01)
USPC .............. 726/9; 380/270; 348/143; 455/41.1; 455/418

(58) Field of Classification Search
CPC . H04L 2209/805; H04W 12/06; H04W 12/08
USPC ............ 726/9, 4; 340/854.6, 854.8; 455/41.1, 455/418; 380/270; 348/143; 235/383, 381, 235/375
See application file for complete search history.

(56) References Cited

U.S. PATENT DOCUMENTS

| | | | | |
|---|---|---|---|---|
| 2003/0007473 | A1* | 1/2003 | Strong et al. ................... | 370/338 |
| 2009/0115573 | A1* | 5/2009 | Naressi et al. ................ | 340/10.1 |
| 2009/0175499 | A1 | 7/2009 | Rosenblatt | |
| 2010/0052856 | A1* | 3/2010 | Macauley et al. ............ | 340/10.1 |
| 2010/0077429 | A1* | 3/2010 | Kim et al. ....................... | 725/37 |

FOREIGN PATENT DOCUMENTS

| | | |
|---|---|---|
| FR | 2864738 | 7/2005 |
| JP | 2005-257378 | 9/2005 |

OTHER PUBLICATIONS

Marquardt,Nicolai;et al.;"Visible and controllable RFID tags"; Apr. 2010; CHI EA '10: CHI '10 Extended Abstracts on Human Factors in Computing Systems; Publisher: ACM, pp. 3057-3062.*
Lee, Donggeon; et al.; "Mobile Platform for Networked RFID Applications "; Information Technology: New Generations (ITNG), 2010 Seventh International Conference on Digital Object Identifier: 10.1109/ITNG.2010.188; Publication Year: 2010 , pp. 625-630.*

* cited by examiner

*Primary Examiner* — Hadi Armouche
*Assistant Examiner* — Angela Holmes
(74) *Attorney, Agent, or Firm* — Hamre, Schumann, Mueller & Larson, P.C.

(57) ABSTRACT

A system for the display, by a user, of multimedia content items, including a network which comprises: a server with a memory in which the multimedia content items are saved, at least one device for the selective display of multimedia content items, which device is able to receive and make available to a user one or more of the multimedia content items that can be obtained from the server, an RFID tag unambiguously coupled to the multimedia device, a plurality of tag readers connected to the server, each able to identify the RFID tag in order to authorise the sending of one or more of the multimedia content items to the device, the tag readers being distributed in an environment according to a mapping known to the server. The RFID tag is programmed with a user identification code such that the multimedia device is identified by the user code associated with the tag as a node of the network and the tag readers are able to locate the multimedia device in the environment in order to authorise it to receive a subset of the multimedia content items.

6 Claims, 5 Drawing Sheets

SYSTEM FOR THE DISPLAY, BY A USER, OF MULTIMEDIA CONTENT ITEMS

BACKGROUND OF THE INVENTION

The present invention relates to a system for the display, by a user, of multimedia content items, of the type comprising a network for the transmission of data and at least one multimedia device associated with the network.

A preferred use of the invention is in a museum context, for the management of guided tours for individuals and groups of users, in an exhibition context and in general when it is desired to provide a user with selectively chosen information based on preselected parameters.

Devices and systems are known that are capable of guiding a user while he/she moves inside an environment, typically during a visit to a museum. An example of such devices is described in US2009/0175499A1 of Apple Inc. In this case, a multimedia device is used such as an iPhone or iPad capable of being connected through a wireless Internet network with a server to download from that server information that is useful for identifying one or more of the exhibited works and for obtaining information about the work, about its creator or about other content. These devices are potentially subject to drawbacks in that, by handling information downloaded from the Internet, they can even replace a tour of the museum leading the user to abandon it in favour of a purely virtual tour. In addition, they do not liven up the tour by interactively stimulating the users and do not have specific options to facilitate and monitor tours by groups following guides.

BRIEF SUMMARY OF THE INVENTION

The technical problem underlying the invention is that of making available a system for the display, by a user, of multimedia content items, a network for implementing the system and a multimedia device associated with the network, the aforementioned items being structurally and functionally designed to enable all the drawbacks complained about with reference to the cited prior art to be overcome.

This problem is tackled and solved by the present invention by means of a network and a device produced in accordance with the claims that follow.

BRIEF DESCRIPTION OF THE SEVERAL VIEWS OF THE DRAWINGS

The features and advantages of the invention will become clear from the detailed description of one of its preferred but not exclusive example applications, illustrated, by way of indication and in a non-limiting manner, with reference to the appended drawings in which.

DETAILED DESCRIPTION OF THE INVENTION

Figure 1:
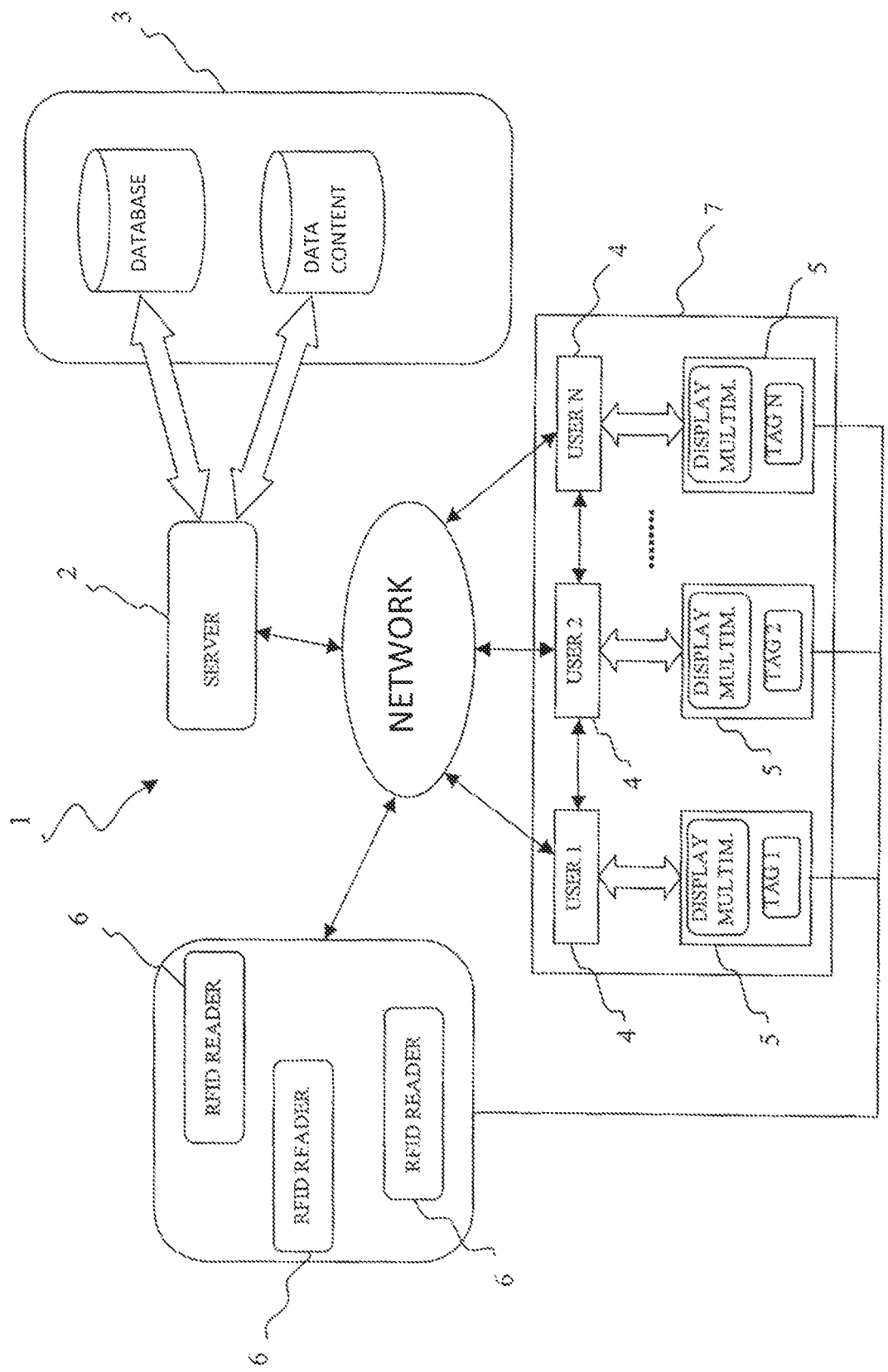
FIG. 1 is a diagram that illustrates the system for the display, by a user, of multimedia content items according to the present invention and the network for implementing the system.

In the drawings, the reference 1 indicates in an overall manner a network for the display, by a user, of multimedia content items stored in a memory 3 of a network server 2.

The network 1 comprises, in addition to the server 2, a plurality of devices for the selective display of multimedia content items, such as smartphones or tablet PCs 4 that are conventional per se, an RFID tag 5, of the active or passive type, coupled unambiguously to each of these multimedia devices 4, and a plurality of tag readers 6 distributed in an environment 7, for example the set of rooms in a museum, according to a mapping known to the server 2.

The network 1 may be implemented as a wireless or wired network, according to techniques that are conventional per se and well known to the person skilled in the art and which will not be discussed further.

Each RFID tag is programmed with a user identification code such that the multimedia device associated with it can be identified by the network server, via the user code associated with the tag, as a node of the network 1. In other words, in this way the multimedia device is given the option of intervening, according to the methods explained below, with the network server and/or with other network users. Thus, the network is used to interconnect the mobile devices tracked by means of the RFID tag readers.

As a priority, the interaction between the tags and the tag readers is used to locate the multimedia devices and to authorise the exchange of data with the server in a manner limited to the exchange authorisations related to the user code and to the location of the position of the tag in the environment.

The system is envisaged for situations in which the information flow is highly dependent on the spatial locations of the person who requires that information, as exactly happens in museums, but as similarly happens at conventions, exhibitions, tours of relatively vast places and other circumstances in which multiple users follow one or more routes along which various images or items of information come together.

The authorisation will be limited to works close to the user and to specific functions to which the user can have access, according to user level definitions previously set in the server.

Figure 2:
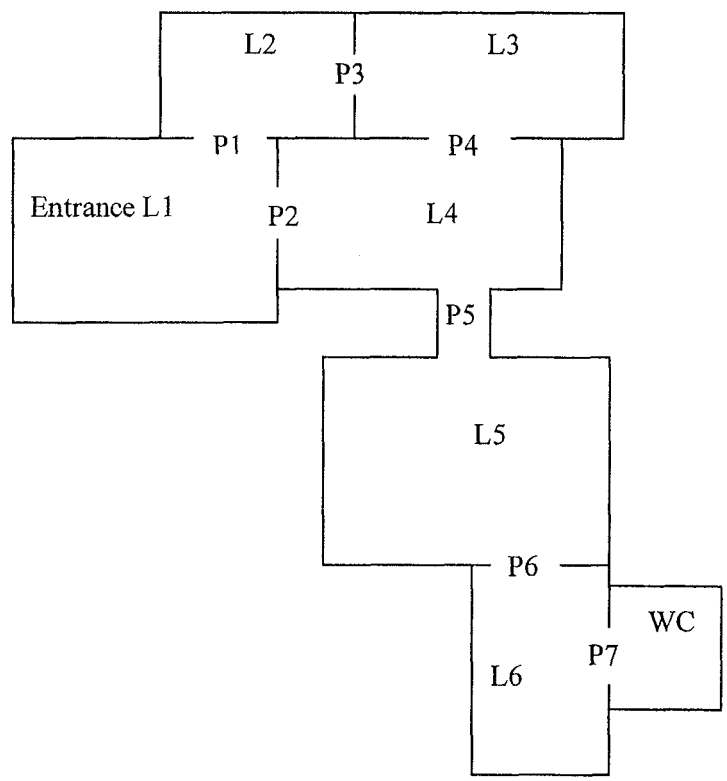
FIG. 2 is a schematic illustration of a museum environment in which the system of the present invention is applied.

Typically, if there is assumed a museum environment (FIG. 2) made up of an entrance room (L1), four exhibition rooms (L2-L5) and an exit room (L6), as well as a toilet facilities room (WC), the rooms being interconnected by means of passages (P1-P6), and if it is assumed that in each room there is placed at least one tag reader 6, having stored the location of the readers on the server 1 it will be possible to know the distribution of the users by locating them in the environment considered and consequently authorising the respective multimedia device 4 to receive from the server 1 a subset of the multimedia content items available at the server and correlated with the room in which each user is located: the said subset of multimedia content items is therefore a function of the user code of each RFID tag and of the location of the tag in the environment considered.

Figure 3:
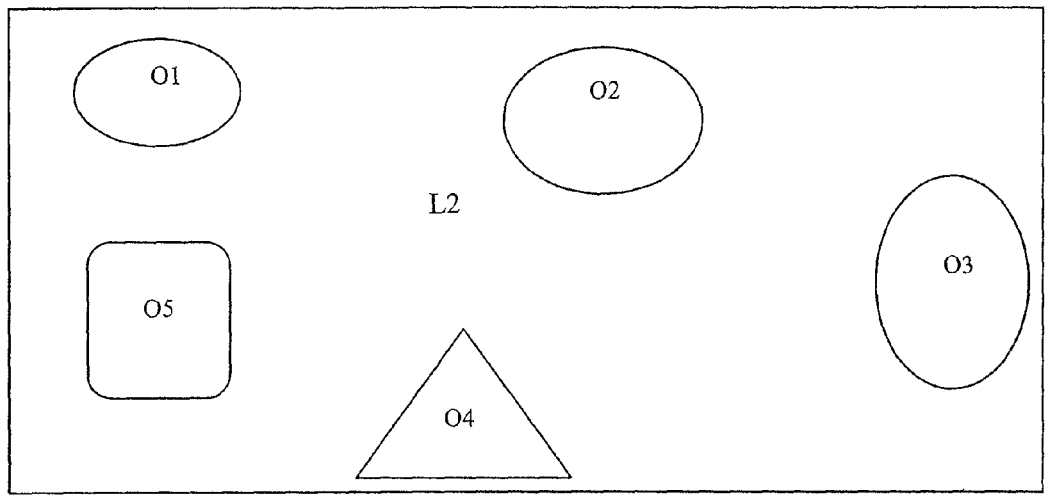
FIG. 3 is a schematic illustration of a room in the museum environment of FIG. 2.

Thus, if there are five exhibited works contained in a room, for example L2, marked O1, O2, O3, O4 and O5 as highlighted in FIG. 3, it is possible to restrict the exchange of data between the user who is passing through and the server 1 to only the works present there.

Figure 4:
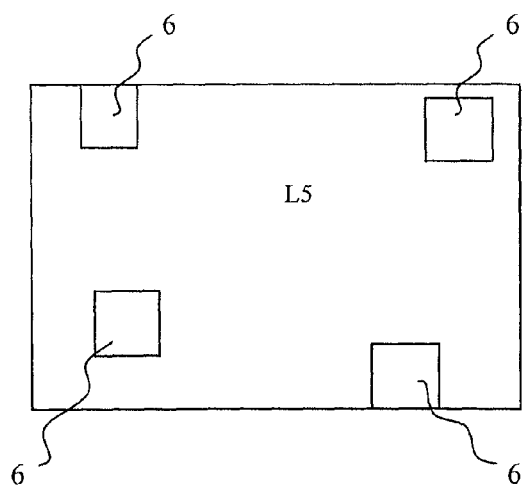
FIG. 4 is a schematic illustration of another room in the museum environment of FIG. 2.

Provision is also made (FIG. 4) in that there can be provided in each room two or more tag readers so as to enable the server 1 to triangulate the position of the user (by means of their TAG) and determine the position relative to the exhibited works. Thus, it will be possible to further limit the interaction between server and multimedia device to an exchange of data related to the work or works that match the user from the position in which he or she is located.

Therefore, once the identity and location of the user are recognised, the network will be capable of offering a personalised service based on the instantaneous situation of that user. That user will access a series of content items correlated with him/her (and with his/her state) authorising, if the relevant circumstances and level authorisations recur, the possibility of data exchange between server and user and/or between several users, through the server and the network 1. It follows that the applications provided for this invention include contexts in which one or more users have a need to access and/or share content items that are dependent on their spatial position when accessing the service.

In the example proposed (museum context):

The museum wishes to make available to its users (visitors, guides, groups) information and multimedia content items pertaining to the objects present in the exhibition rooms, and make available information for example on routes recommended according to the interests of the user, on the maximum tour time, and on contingent requirements (bars, toilet facilities). Furthermore, it is desired to allow touring users to exchange information and opinions on the exhibited objects.

There is arranged for the service a database of information related to the topic covered, which information can be displayed only within the specialist area in the museum and stored in a memory accessible to the server. The museum, if lacking, is equipped with network infrastructure so as to allow the touring users access to the local network (intranet) and to the content items present therein.

A user equipped with a multimedia device compatible with the system, once they have entered the area of coverage of the service, is provided with an RFID tag which allows both their unambiguous identification as a network node and their spatial location within the museum rooms. If the visitor lacks one, the museum makes arrangements to equip the user with a device, of the smartphone or tablet PC type, for the selective display of multimedia content items, the usability of which device will be limited solely to functions admitted by the service.

The user is therefore authenticated for access to the network (by manual authentication, by the user him-/herself, or carried out by the network itself) making the network capable of unambiguously identifying the user and locating him/her in the environment of the museum. Thus, there is authorised a service targeted to and personalised for the user based on their location (among other possible parameters). For example, there can be proposed on a user's multimedia device a list of works very close to the user's position, with a possible option of checking which of those have been discovered more by other users, or allowing the user access to a chat facility in which a conversation between the other users present in the room is taking place in real time.

Provision is made for the possibility of managing various types of users, for example a "master" and a "slave". Referring to the museum example, the guide of a group will for example be master, while the individual user or the user belonging to a given group associated with a master user will be slave.

The master user will be authorised through the recognition of his/her RFID tag code to receive from and transmit to the slave users connected to him/her via a linking phase defined by the system. He/she can impose a defined behaviour on the slave terminals, for example duplicating his/her monitor on the monitors of the slave terminals. Every action, such as the highlighting of a detail, the change of a mask, or any other variation in the elements displayed by the monitor will be reproposed on all the slave terminals connected to him/her.

The slave user can be linked or not linked to the master user and therefore can decide whether or not to be influenced by the actions of the master user. At any moment, he/she will in any case be able to be released from the actions undertaken by the master user in order to follow an independent route.

Finally, provision is made such that one or more sensors can be associated with the RFID tags, which sensors are capable of detecting environmental data, events or other information inputted in the network by means of the tag readers in order to be stored in a network database. Thus, there can be detected events that are harmful for the exhibited works, flagged in real time by the visitors, variations in environmental parameters, or simple information useful for statistical purposes.

Figure 5:
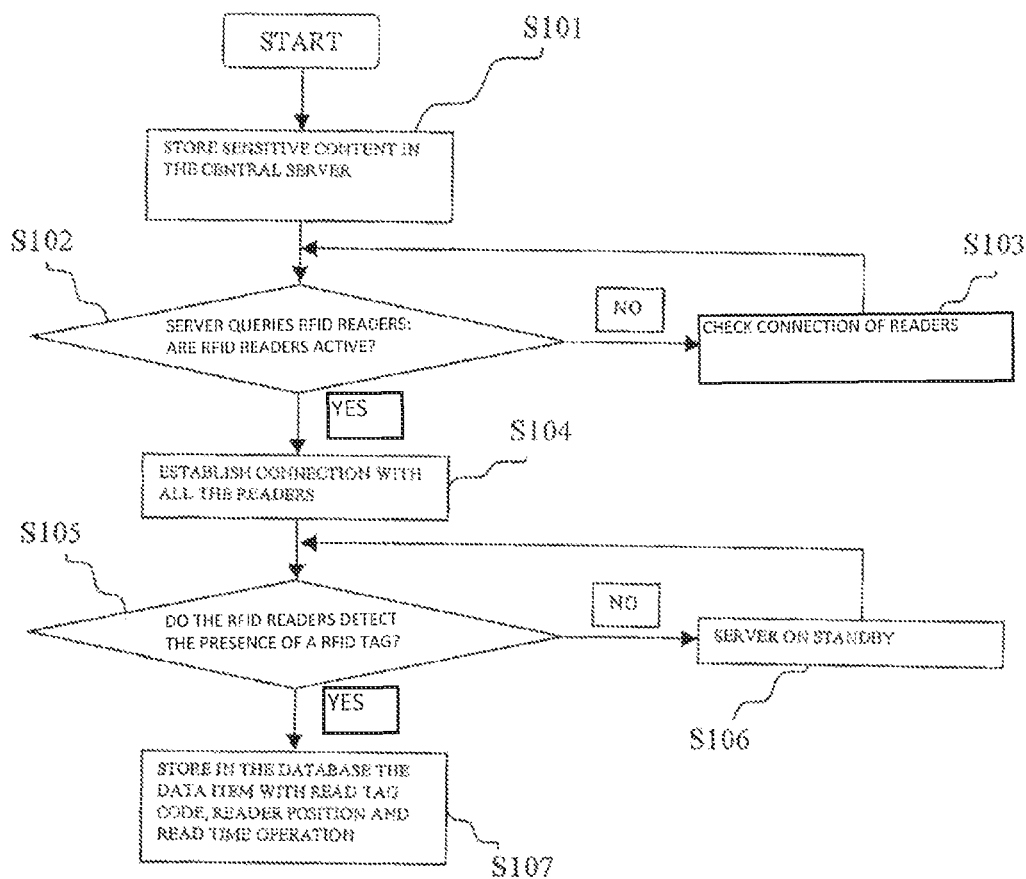
FIGS. 5 and 6 are flow diagrams that illustrate the information flow from the server end and from the client end, respectively, of the system according to the present invention.
Figure 6:
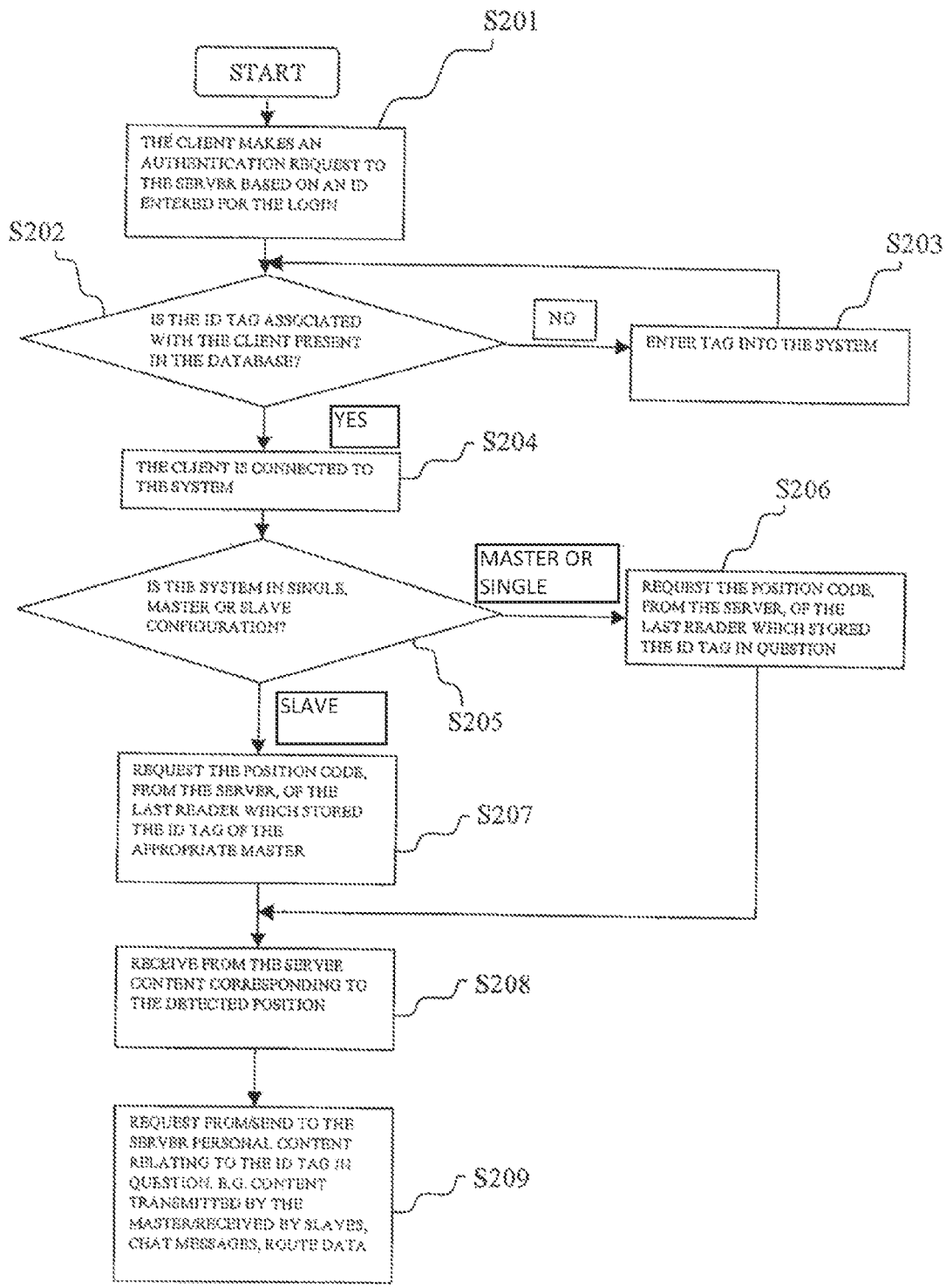

FIGS. 5 and 6 present information flows from the server end and from the user end respectively.

The server-end information flow starts with the storing of multimedia content items and of other sensitive information in the server 3 (step S101).

Next, the server queries the RFID readers in order to check whether they are actually active (step S102).

If the response is negative, a check on the actual connection of the readers is carried out (step S103).

Once the activation of the readers is verified (step S104), the server establishes a connection with all the readers, so as to start searching for tags within the field of detection of the readers (step S105).

If no tags are detected as being present, the server remains on standby (step S106) until a tag is identified and, following detection, there is stored in the database of the server a data item relating to an identification code of the detected tag and, additionally, to the position of the reader and to the read time (step S107). The information flow from the server end is concluded with this last step.

As regards the client end, the information flow starts (step S201) with an authentication request to the server by the client, carried out on the basis of an identification code ID, or ID tag, which is inputted as a login to the system.

Following the request (step S202), the system checks whether the identification code ID of the tag from which the request is initiated is present in the system, entering it in the system (step S203) if it is not present.

When the ID code is present, the client is connected to the system (step S204).

Once the connection is made, the system checks whether it is in single, master or slave configuration (step S205). If the system is in master or single configuration, the system requests from the server the position code of the last reader which stored the ID tag in question (S206).

In the case of a slave configuration, the system requests from the server the position code of the last reader which stored the ID tag of the appropriate master (S207).

Once one of these two requests to the server has been carried out, content items corresponding to the detected position are received from the server (S208).

Lastly, the client-end flow is concluded by the requesting from/sending to the server personal content items relating to the ID tag in question, for example content items transmitted by the master or received by slaves, chat messages, or even data on the route followed by a user (S209).

The system provides for the use of RFID technology for the purpose of implementing intercommunicability and sharing of multimedia content items in which:

an RFID tag is associated with every user of the system for the purposes of identifying them spatially and as a network node;

a system of RFID readers is used, the spatial positioning of which provides for defining a mapping of the physical place of installation;

a network infrastructure is used to offer users a service of intercommunicability and display of content items according to a spatial identification and as network node;

through the abovementioned infrastructure, a communication is performed through connected mobile devices according to their positioning and to the preferences expressed by the user;

the communication between the terminals also allows approval ratings to be cast on the topics/content items taken into consideration.

By means of the server inside, the following data-processing can also be performed:

the data of the read RFID tags is crossed with the data picked up from the users to obtain their unambiguous identification;

the data obtained from the RFID tag reader is used to propose targeted information services to the users;

the data entered by the users is used for statistical purposes, to analyse content items proposed by the system.

Among the main advantages offered by the present invention, there is the fact that:

The information transmitted to the user can be viewed only while the user is in the area of coverage of the service. All the content items that are subject to restrictions, for example for reasons of security, confidentiality, rights of third parties, will therefore not be able to be exported outside the area of coverage, laying down an obligation to be able to clear the system cache from the device used or to provide a device which remains under the control of the museum or other provider of the service.

Multimedia devices that temporarily take advantage of the service can communicate dynamically with each other through the possibility of audio and video transmission in real time provided by the network server. They can also access an integrated chat system.

The network itself is enriched by the exchange of user information, such as, by way of example, preferences and notes added to the content. The museum body (or provider of the service) thus increases its information offering with the contribution provided by the users.

It is not necessary to apply tags to the works (an operation that is sometimes completely inadmissible), these works being identified and located in the respective rooms by means of the data inputted in the database of the server.

The user can take advantage of additional services such as suggestions on the most suitable route for their requirements or on the remaining tour time.

What is claimed is:

1. A system for displaying multimedia content items via a network, the system comprising:
   a server including a memory in which the multimedia content items are saved;
   at least one multimedia device for selectively displaying the multimedia content items, wherein the multimedia device is able to receive one or more of the multimedia content items via the network from the server;
   a radio-frequency identification (RFID) tag provided with a user identification code, wherein the RFID tag is unambiguously coupled to the multimedia device;
   a plurality of tag readers in communication with the server, each of the tag readers being configured to identify the RFID tag in order to authorize sending of one or more of the multimedia content items to the multimedia device associated with the identified RFID tag, the tag readers being arranged in an environment according to a mapping information of the tag readers stored in the server;
   the tag readers being able to locate the multimedia device in the environment in order to authorize the multimedia device to receive from the server a targeted and personalized subset of the multimedia content items, the targeted and personalized subset of the multimedia content items being based on the user identification code and of the location of the RFID tag; and
   the multimedia device being able to receive and display the personalized subset of the multimedia content items;
   wherein the targeted and personalized subset of the multimedia content items comprise a chat service between users identified and located in the environment.

2. The system according to claim 1, wherein the network is a wireless network.

3. The system according to claim 1, wherein two or more tag readers are arranged in the environment so as to allow a triangulation of the RFID tag in the environment.

4. The system according to claim 1, wherein the targeted and personalized subset of the multimedia content items comprise information on a route of transit through the environment.

5. The system according to claim 1, further comprising one or more detection sensors associated with the RFID tag, wherein the detection sensors are capable of signaling to the tag readers events or environment-related data, and/or inputting data to the server via the network, wherein the data can be stored in the memory of the server.

6. A system for displaying multimedia content items via a network, the system comprising:
   a server including a memory in which the multimedia content items are saved;
   at least one multimedia device for selectively displaying the multimedia content items, wherein the multimedia device is able to receive one or more of the multimedia content items via the network from the server;
   a radio-frequency identification (RFID) tag provided with a user identification code, wherein the RFID tag is unambiguously coupled to the multimedia device;
   a plurality of tag readers in communication with the server, each of the tag readers being configured to identify the RFID tag in order to authorize sending of one or more of the multimedia content items to the multimedia device associated with the identified RFID tag, the tag readers being arranged in an environment according to a mapping information of the tag readers stored in the server;
   the tag readers being able to locate the multimedia device in the environment in order to authorize the multimedia device to receive from the server a targeted and personalized subset of the multimedia content items, the targeted and personalized subset of the multimedia content items being based on the user identification code and of the location of the RFID tag; and
   the multimedia device being able to receive and display the personalized subset of the multimedia content items;
   wherein the RFID tags are configured to identify a user of a master-type and one or more users of a slave-type, wherein the multimedia device of the user of the master-type is configured to selectively impose a defined behavior on the multimedia device of the user of the slave type.

* * * * *